United States Patent [19]

MacMillan et al.

[11] 4,291,362
[45] Sep. 22, 1981

[54] FEED THROUGH CAPACITORS AND METHOD OF INSTALLING

[76] Inventors: Deane B. MacMillan, 1119 Wheaton Dr., Troy, Mich. 48099; Carolyn L. Donigan, 685 Hickory Heights Dr., Bloomfield Hills, Mich. 48013

[21] Appl. No.: 102,063
[22] Filed: Dec. 10, 1979
[51] Int. Cl.³ .............................................. H01G 4/42
[52] U.S. Cl. ................................. 361/302; 29/25.42; 339/97 R; 361/328
[58] Field of Search ............... 333/182, 183; 29/25.42; 361/302, 307, 271, 329, 328, 330; 339/97 R, 97 C, 97 L

[56] References Cited

U.S. PATENT DOCUMENTS

| 3,159,776 | 12/1964 | Metcalf | 361/329 |
| 4,167,035 | 9/1979 | Willard | 361/330 X |

FOREIGN PATENT DOCUMENTS

| 730530 | 5/1932 | France | 361/328 |
| 62852 | 6/1955 | France | 361/271 |
| 217144 | 1/1942 | Switzerland | 361/302 |
| 229964 | 3/1925 | United Kingdom | 361/307 |

*Primary Examiner*—Elliot A. Goldberg
*Attorney, Agent, or Firm*—Krass, Young & Schivley

[57] ABSTRACT

Apparatus and a method of installing feed through capacitors for automotive radio frequency suppression applications, in which a number of the capacitors are employed, each interposed between a power supply terminal and an electrically powered device. The method includes the step of assembling the capacitor components to an insulated wire, which is of the required length to extend from the power supply terminal to the powered device, eliminating the need for separately connected leads to and from the capacitor. Also included is a contact disc clip retainer crimped to the insulated wire to anchor the capacitor components thereto. The capacitor windings are also received over the insulated wire and positioned with one end face in abutment against the contact disc clip retainer disposed within a metallic capacitor housing. A D-clip engages the opposite face of the capacitor windings and in turn engages the interior metallic fastener housing which is grounded. The invention is particularly adapted to installations requiring a number of varying lead lengths, such that a number of different lengths of insulated wire are employed.

4 Claims, 4 Drawing Figures

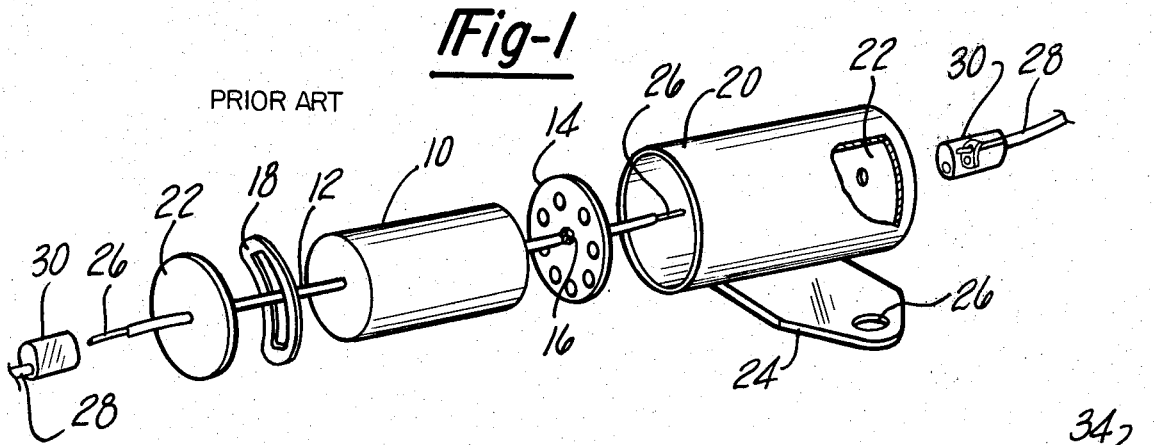
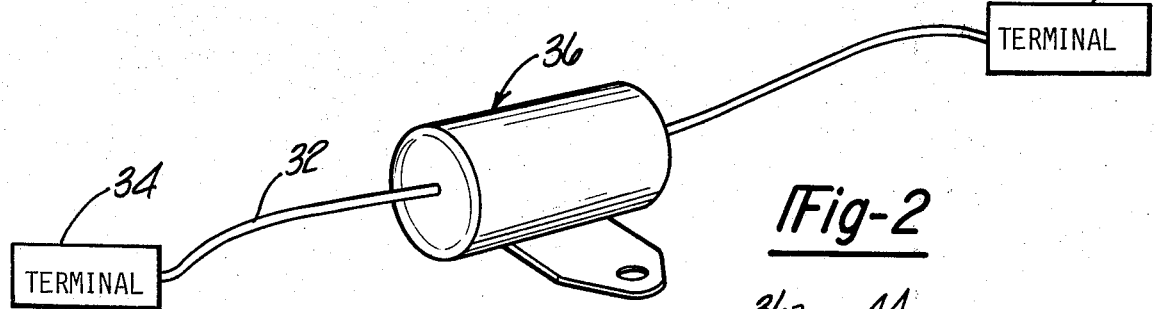
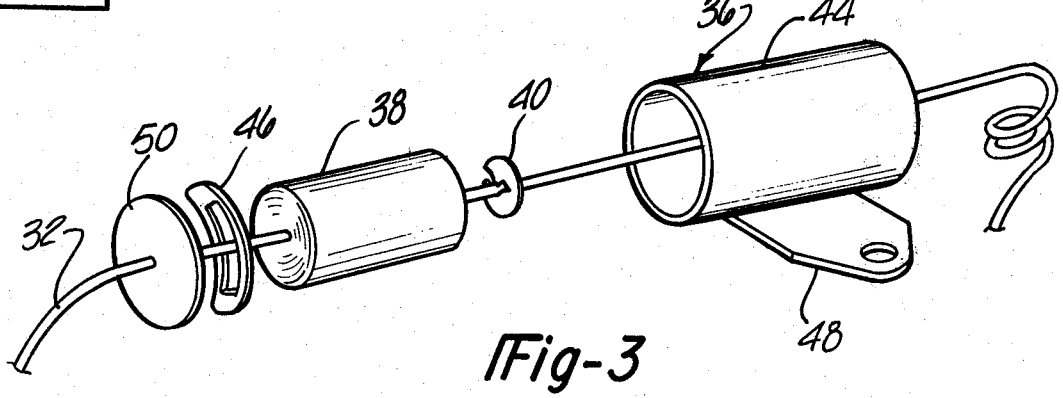
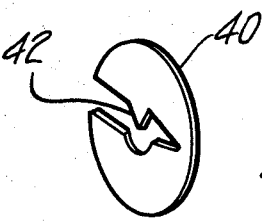

FEED THROUGH CAPACITORS AND METHOD OF INSTALLING

BACKGROUND DISCUSSION

Feed through capacitors are often employed for radio frequency suppressors in power supply circuits for such applications as DC powered devices for automotive vehicles, i.e., for electric motor driven devices such as fan blower motors, power window drives, etc. A capacitor is installed between the power supply and the electric motor so that one side of the capacitor windings is connected into the circuit power supply line and the opposite side of the capacitor windings is grounded so as to reduce the radio frequency radiation from the particular circuit resulting from high frequency components generated in the circuit.

U.S. Pat. No. 3,986,084, assigned to the assignee of the present application, discloses a "universal" feed through capacitor in which the drive of the capacitor windings is connected to the power circuit lines provided by a rigid conductive blade having opposite male and female ends adapted to mate with plug-in leads. In this instance, one end of the blade is connected to the device being powered and the opposite end connected into the source of power from the vehicle wiring harness.

It can be appreciated that due to the variety of electrically powered devices at varying locations within the vehicle chassis that the leads to and from the wiring harness and the device vary in length considerably.

Accordingly, each of the lead lengths is manufactured separately from the capacitor and the capacitor is later installed by connecting the lead ends to the capacitor blade.

The conventional approach has been to manufacture the capacitor with a through extending insulated wire of a relatively short length so as to protrude through either end of the capacitor assembly. The wire is secured to a contact disc by removing a section of the insulation and soldering the contact disc to the exposed wire. The contact disc is placed in position against one end face of the capacitor windings and the opposite end face of the capacitor windings is in contact with a D-clip which extends into contact with the capacitor or "can" which is made of metal and which constitutes the grounding connection for the capacitor.

The connecting leads necessary between the powered device and the wiring harness are joined to the ends of the through wire by means of wire connecting crimping fittings.

In either of the above designs, the adaptation of a single capacitor to each of the installations by connecting separate leads to the conductive blade or the central wire involves the separate cost of making the connections to the capacitor and the cost of the wire connectors, or the mating male ad female connectors in the case of the design described in the above-cited patent.

In addition, a reliability problem has been encountered in insuring a good electrical connection at these points.

In the case of the latter-described embodiment, the method of securing the contact disc to the central wire also is relatively costly, and due to breakage of the soldered connection, also may produce incidence of loss of electrical contact.

Accordingly, it is an object of the present invention to provide a method of manufacturing a capacitor and installing such capacitor in those applications in which separate leads to the various terminal connections are not required, to thereby eliminate the cost and incidence of failure associated with such separately installed leads.

It is a further object of the present invention to provide a means for anchoring capacitor windings to a central lead line wire which does not involve a soldered connection of the lead line to the central wire, while insuring good electrical contact and anchoring of the capacitor to the central wire.

SUMMARY OF THE INVENTION

These and other objects of the present invention, which will become apparent upon a reading of the following specification and claims, are achieved by a method of manufacture of a capacitor in which a length of insulated wire is employed for each particular installation which is of a length corresponding to that necessary to make the appropriate connections between the powered device and the point of connection into the wiring harness. The length of insulated wire has assembled to it at an appropriate location along its length thereof the capacitor such as to eliminate the need for separate leads to and from the capacitor. The manufacturing steps include the assembly of the capacitor windings onto the lead at the point corresponding to the proper location of the capacitor. A contact disc-retainer clip is secured to the wire by penetrating prong ends through the insulation and into the conductor serving to securely anchor the disc to the wire, and to establish the electrical contact.

The capacitor winding is in position against the end face of the contact disc with a conventional D-clip placed in position against the opposite face. The entire assembly is assembled within the capacitor housing or "can" and encapsulated therein.

The necessary connections to the terminals are then made at installation. A number of such capacitors are provided, each having a central lead of a length suitable for each of the varying distances between the points of connection into the circuit, and each installed in its respective power circuit.

DESCRIPTION OF THE DRAWINGS

FIG. 1 is an exploded perspective view of a capacitor design of the prior art type described above.

FIG. 2 is a perspective view of an assembled capacitor and a schematic representation of a terminal connection thereto.

FIG. 3 is an exploded perspective view of the capacitor depicted in FIG. 2 indicating the major components thereof.

FIG. 4 is a perspective view of a contact disc-retainer clip of the type shown installed in FIG. 3.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, the prior art arrangement is depicted as recited above.

This arrangement includes capacitor winding 10 which is assembled onto a central insulated wire 12. Such windings are well known in the art, and are wound with offset windings so as to enable electrical contacts on either side of the capacitor winding 10.

One side is provided with a solder disc 14 which is joined to the central insulated wire 12 by stripping the insulation at one point thereof with a small opening in the solder disc 14 with a soldered connection 16 made thereto to provide electrical contact and also mechanical securement of the disc to the central insulated wire 12. The opposite end face of the capacitor winding 10 is contacted with a spring D-clip 18 which has a clearance opening accommodating the central insulated wire 12 and which is of a size so as to frictionally engage the interior of a metallic conductive capacitor housing or "can" 20 and to be retained therein in firm position against the lefthand face of the capacitor winding 10 as viewed in FIG. 1. The entire assembly is encapsulated in the interior of the can 20 with end caps 22 provided.

The can 20 itself constitutes the grounding connection and typically the mounting strap 24 is provided with a screw hole 26 for securement and electrical connection to ground.

Each protruding end of the central insulated wire 12 is then mechanically connected to the necessary leads 28 by means of mechanical connectors 30 with lengths of each of the leads 28 selected to make the necessary connection to either end, i.e., to the powered device and to the wiring harness.

This is disadvantageous due to the necessity for the mechanical connectors 30 and the labor of installing the same and in addition reduces the reliability of the device since improper electrical connections may occur at this point. Also, the mechanical connection of lead 28 to connector 30 must be insulated, commonly done by lengths of shrink tubing received over the assembly.

Similarly, the soldered connection 16 tends to be an unreliable method for securing the solder disc 14 and central insulated wire 12.

Accordingly, according to the concept of the present invention, rather than providing separate leads, the capacitor itself is assembled to a single central lead which corresponds in length to that necessary to extend from the wiring harness to the powered device.

Thus, only a single lead is employed, eliminating the necessity for separately connected leads.

In a given application, a number of such varying length leads are required. A capacitor is assembled to each of the lead lengths appropriate for each installation, with the capacitors secured thereto at an appropriate point such as to locate the capacitor at the point of installation of the capacitor housing.

This method is depicted in FIG. 2 whereat the central wire 32 is of a single continuous length and extends intermediate a pair of terminals depicted schematically at 34. The capacitor 36 is secured and electrically connected to the central wire 32 by the manufacturing steps to be described such as to be located along the length of central wire 32 at an appropriate point and to provide the necessary connection to the windings.

A method of assembling the capacitor 36 is indicated in FIG. 3. In this case, the winding 38 is of conventional offset wound design and is disposed on the insulated central wire 32 and at assembly is positioned in abutment against a contact disc-retainer clip 40 which is pressed or crimped onto the point in the length of the central wire 32 appropriate to properly locate the capacitor 36.

The contact disc-retainer clip 40 is depicted in FIG. 4 and includes a prong 42 which is sharp so as to be able to penetrate the insulation, and to pass into and be retained in connection with the conductive wire itself.

Thus, the contact disc-retainer clip 40 acts to establish an electrical connection, as well as a mechanical anchor thereto.

The winding 38 is positioned in abutment against the contact disc-retainer clip 40 and within the conductive metallic capacitor housing 44, with an appropriate end cap (not shown) and encapsulating material mechanically joining the capacitor housing 44 to the winding 38.

The opposite end face of the winding 38 is contacted by a conventional D-clip 46 which has a central opening accommodating the central wire 32 and which is crimped as in the above-described prior art design and dimensioned so as to mechanically engage the interior of the capacitor housing 44 and establish an electrical connection with the windings protruding on the lefthand side of the winding as in FIG. 3 and the capacitor housing.

Thus, the mounting strap 48 provides a grounding electrical connection. End cap 50 is placed over the assembly in conjunction with the final encapsulation of the assembly.

Accordingly, pursuant to the concept of the present invention, in such installations as in automotive radio frequency suppressor applications, each of the particular circuits requiring such suppressors is provided with a capacitor and lead assembly in which a single lead appropriate to the necessary lead length for that installation is assembled to the capacitor. Accordingly, separate leads are not required to install a given capacitor, but direct connection of the lead into the wiring harness provides the connection of the capacitor at the same time.

This substantially reduces the cost and increases the reliability of the installation due to the elimination of the labor involved in making separate connections to the leads, as well as the cost of the mechanical connectors required.

In high volume production, as is encountered in automotive applications, the reduction in manufacturing expense and the enhancement of reliability is a very substantial factor and provides pronounced superiority of the methodology of the present invention over the prior art practices described above.

The embodiments of the invention in which an exclusive property or privilege is claimed are defined as follows:

1. A method of installing radio frequency suppressing capacitors in automotive applications in which a plurality of capacitor installations are required, each installation requiring a different lead length from the point of connection of the leads into respective automotive wiring harness terminals and to the point of connection with the power devices to which the radio frequency suppressing capacitors are associated, the method comprising the steps of:

providing for each installation a continuous insulated wire of sufficient length for making uninterrupted electrical connection between its respective wiring harness terminal and associated power device; and assembling the feed through capacitors to their respective wires at different selected locations along the lengths thereof between said points of connection by crimping a component of each capacitor to their respective wires.

2. A method of assembling and installing a feed through capacitor into a circuit intermediate two remotely spaced points of terminal connection, the method comprising the steps of:

providing a continuous length of insulated lead line corresponding to the distance between said points of terminal connection;

passing said same lead line through a plurality of disassembled capacitor components;

assembling said capacitor components to said lead line at a selected location along the length thereof, including the steps of creating an electrical connection between one side of said capacitor and an electrical conductor in said lead line; providing a grounding connection for said capacitor; and mechanically connecting said capacitor to said lead line; by crimping a component to said lead line and connecting opposite ends of said lead line directly to said terminal connections whereby to provide uninterrupted electrical connection therebetween.

3. The method according to claim 2 wherein said steps of creating said electrical connection and said mechanical connection thereto is accomplished by crimping a contact disc through said insulated lead line into electrical connection with said conductor and positioning said contact disc against an end face of a capacitor winding.

4. An offset winding feed through capacitor comprising:

a central insulated lead line;

a contact disc-retainer clip comprising a generally flat element having prongs formed thereon adapted to penetrate the insulated lead line and to be crimped in position on said lead line;

a capacitor winding assembled with said lead line extending therethrough, with one end face of said winding in abutment against the crimped contact disc-retainer clip;

a metallic housing enclosing said winding and contact disc-retainer clip; and an electrically conductive clip positioned against an opposite face of said capacitor winding in contact with the interior of said housing.

* * * * *